US010274726B2

(12) United States Patent
Hickerson et al.

(10) Patent No.: US 10,274,726 B2
(45) Date of Patent: Apr. 30, 2019

(54) DYNAMIC EYEBOX CORRECTION FOR AUTOMOTIVE HEAD-UP DISPLAY

(71) Applicant: Panasonic Automotive Systems Company of America, Division of Panasonic Corporation of North America, Peachtree City, GA (US)

(72) Inventors: Dallas Dwight Hickerson, Sharpsburg, GA (US); Thomas Ray Burns, Atlanta, GA (US)

(73) Assignee: Panasonic Automotive Systems Company of America, Division of Panasonic Corporation of North America, Peachtree City, GA (US)

( * ) Notice: Subject to any disclaimer, the term of this patent is extended or adjusted under 35 U.S.C. 154(b) by 0 days.

(21) Appl. No.: 15/487,180

(22) Filed: Apr. 13, 2017

(65) Prior Publication Data

US 2017/0299873 A1  Oct. 19, 2017

Related U.S. Application Data

(60) Provisional application No. 62/321,844, filed on Apr. 13, 2016.

(51) Int. Cl.
| | | |
|---|---|---|
| *G02B 27/01* | (2006.01) | |
| *G06F 3/01* | (2006.01) | |
| *G02B 26/10* | (2006.01) | |
| *G02B 27/00* | (2006.01) | |

(52) U.S. Cl.
CPC ....... *G02B 27/0101* (2013.01); *G02B 26/101* (2013.01); *G02B 27/0093* (2013.01); *G06F 3/013* (2013.01); *G02B 2027/014* (2013.01); *G02B 2027/0138* (2013.01); *G02B 2027/0159* (2013.01); *G02B 2027/0181* (2013.01); *G02B 2027/0187* (2013.01)

(58) Field of Classification Search
CPC combination set(s) only.
See application file for complete search history.

(56) References Cited

U.S. PATENT DOCUMENTS

| | | | | |
|---|---|---|---|---|
| 6,512,522 | B1* | 1/2003 | Miller et al. | G06T 11/203 345/474 |
| 6,731,435 | B1* | 5/2004 | Kormos et al. | G02B 26/0816 345/7 |
| 2015/0331239 | A1* | 11/2015 | Ando | G02B 27/01 359/631 |
| 2016/0239995 | A1* | 8/2016 | Aramaki | G06T 17/05 |
| 2017/0153457 | A1* | 6/2017 | Kunze | G02B 27/0179 |

* cited by examiner

*Primary Examiner* — Aneeta Yodichkas
*Assistant Examiner* — Deeprose Subedi
(74) *Attorney, Agent, or Firm* — Laurence S. Roach, Esq.

(57) ABSTRACT

A head up display arrangement for a motor vehicle includes an image source providing illuminated images. At least one mirror is positioned to provide a first reflection of the illuminated images. A windshield is positioned to receive the first reflection and provide a second reflection of the illuminated image such that the second reflection is visible to a driver of the vehicle who has at least one eye within an eyebox defined by the second reflection. An image capturing device captures images of a head of a driver of the motor vehicle. An electronic processor adjusts, based on the captured images of the driver's head, the illuminated images and/or a position of the at least one mirror.

12 Claims, 7 Drawing Sheets

DYNAMIC EYEBOX CORRECTION FOR AUTOMOTIVE HEAD-UP DISPLAY

CROSS-REFERENCE TO RELATED APPLICATION

This application claims benefit of U.S. Provisional Application No. 62/321,844 filed on Apr. 13, 2016, which the disclosure of which is hereby incorporated by reference in its entirety for all purposes.

FIELD OF THE INVENTION

The disclosure relates to a head up display in a motor vehicle.

BACKGROUND OF THE INVENTION

Automotive head up displays (HUDs) are typically designed to project a virtual image that appears to be several feet/meters in front of the windshield. For example, BMW states, "The image is projected in such a way that it appears to be about two meters away, above the tip of the bonnet, making it particularly comfortable to read. BMW Head-Up Display halves the time it takes for eyes to shift focus from road to the instruments and back. The system's height can be adjusted for optimal viewing." This effect is accomplished by collimation, which is the process of making light rays parallel, and may include the adjustment or alignment of optical axes. The trade-off of image collimation is that the eye tends to focus on infinity, i.e., at the same distance as the road ahead. However, inside the vehicle cabin, the optimum image is only viewable within a small spatial area behind the steering wheel, i.e., the "eyebox". The position of the eyebox is defined by the position of the collimated image reflected off of the windshield.

The optical collimator produces a cylinder of parallel light such that the display can be viewed only while the viewer's eyes are somewhere within that cylinder, a three-dimensional area referred to as the "head motion box" or "eyebox". Modern HUD eyeboxes are usually about 5 lateral inches by 3 vertical inches by 6 longitudinal inches. These dimensions allow the viewer some freedom of head movement, but movement too far up/down or left/right will cause the display to vanish off the edge of the collimator, and movement too far back will cause it to crop off around the edge. The driver is able to view the entire display as long as one of his eyes is inside the eyebox.

Known HUDs have a fixed eyebox. A driver using an existing HUD would have to keep his eyes within that fixed space in order to see what is being displayed by the HUD.

SUMMARY

The present invention may provide an arrangement for a head up display which detects the driver's head/eye position and adjusts the systems optics and/or projected image in order to expand or relocate the eyebox. Thus, the display may be visible to the driver regardless of the driver's posture, seat position, or other physical variables. In contrast to conventional HUDs, the inventive arrangement may include a driver-facing camera or other sensor(s) to determine the position of the operator's eyes relative to the eye box location.

In addition to expanding or adjusting (e.g., relocating) the eyebox, the HUD's virtual image may incorporate three-dimensional effects appropriate for the viewer's eye position, providing the viewer a sense of perspective/depth with respect to the displayed graphics.

In another embodiment, instead of expanding or relocating the eyebox itself, the HUD contents may be re-arranged so that the most important information (e.g., speed, pedestrian warning, etc.) is moved to the part of the eyebox that is visible given the driver's head position.

In one embodiment, the invention comprises a head up display arrangement for a motor vehicle, including an image source providing illuminated images. At least one mirror is positioned to provide a first reflection of the illuminated images. A windshield is positioned to receive the first reflection and provide a second reflection of the illuminated image such that the second reflection is visible to a driver of the vehicle who has at least one eye within an eyebox defined by the second reflection. An image capturing device captures images of a head of a driver of the motor vehicle. An electronic processor adjusts, based on the captured images of the driver's head, the illuminated images and/or a position of the at least one mirror.

In another embodiment, the invention comprises a head up display method for a motor vehicle, including providing illuminated images, and positioning at least one mirror to provide a first reflection of the illuminated images. A second reflection of the illuminated images off of a windshield of the motor vehicle is provided such that the second reflection is visible to a driver of the vehicle who has at least one eye within an eyebox defined by the second reflection. Images of a head of a driver of the motor vehicle are captured. Based on the captured images of the driver's head, the illuminated images and/or a position of the at least one mirror are adjusted.

In yet another embodiment, tire invention comprises a head up display arrangement for a motor vehicle including an image source providing illuminated images. A first mirror is positioned to provide a first reflection of the illuminated images. A first motor is mechanically coupled to the first mirror in order to drive a position of the first mirror. A second mirror is positioned to receive the first reflection of the illuminated images and provide a second reflection of the illuminated images. A second motor is mechanically coupled to the second mirror in order to drive a position of the second mirror. A windshield is positioned to receive the second reflection and provide a third reflection of the illuminated images such that the third reflection is visible to a driver of the vehicle who has at least one eye within an eyebox defined by the third reflection. An image capturing device captures images of a head of a driver of the motor vehicle. An electronic processor is connected by electrical or other means [optical, RF] for communication to each of the image source, the first motor, the second motor, and the image capturing device. The electronic processor calculates a position of the eyebox based on the illuminated images and the positions of the first mirror and the second mirror. The electronic processor also calculates, based on the captured images of the driver's head, positions of the driver's eyes. The electronic processor adjusts the illuminated images, a position of the first mirror, and/or a position of the second mirror. The adjusting is performed such that a center of the eyebox is moved closer to the driver's eyes.

BRIEF DESCRIPTION OF THE DRAWINGS

A better understanding of the present invention will be had upon reference to the following description in conjunction with the accompanying drawings.

DETAILED DESCRIPTION OF THE PREFERRED EMBODIMENTS

Figure 1:
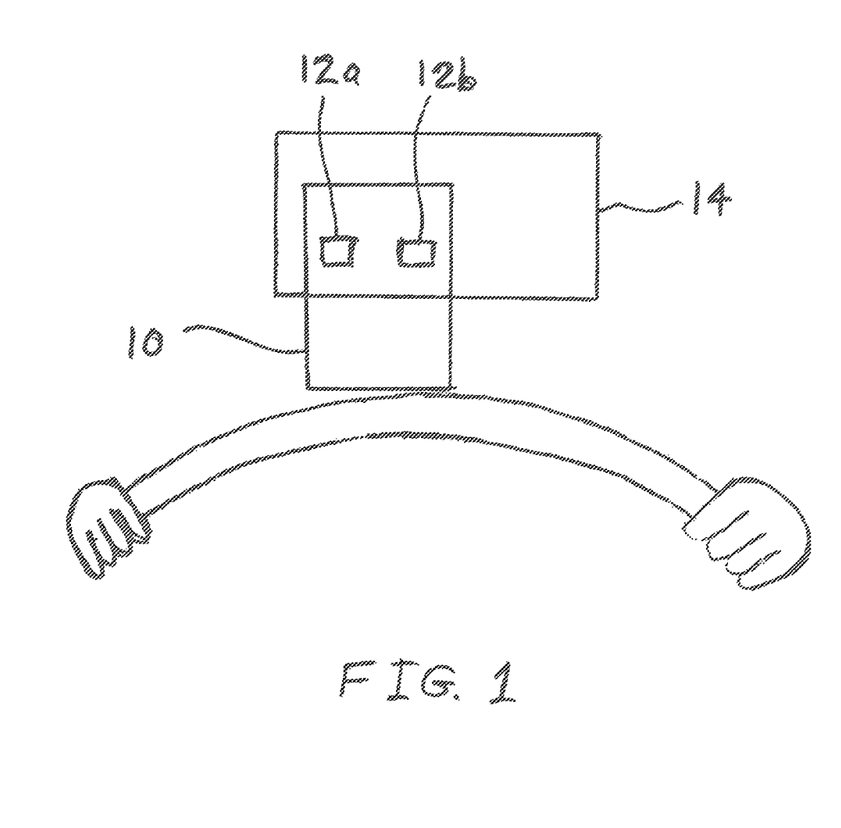
FIG. 1 is a plan view of the position of a driver's head relative to an eye box of a head up display.

FIG. 1 illustrates the position of a driver's head relative to an eye box of a head up display. The position of the driver's head is represented by rectangle 10, the positions of the driver's eyes are represented by rectangles 12a-b, and the position of the eye box is represented by rectangle 14. The vehicle operator's stature or posture could place his eyes outside the HUD's eyebox. In this example, an image captured by a driver-facing camera may be evaluated by facial recognition software to determine the driver's eye position. By subsequent software operations, the determined eye position may then be compared to the calibrated HUD eyebox position.

Figure 2:
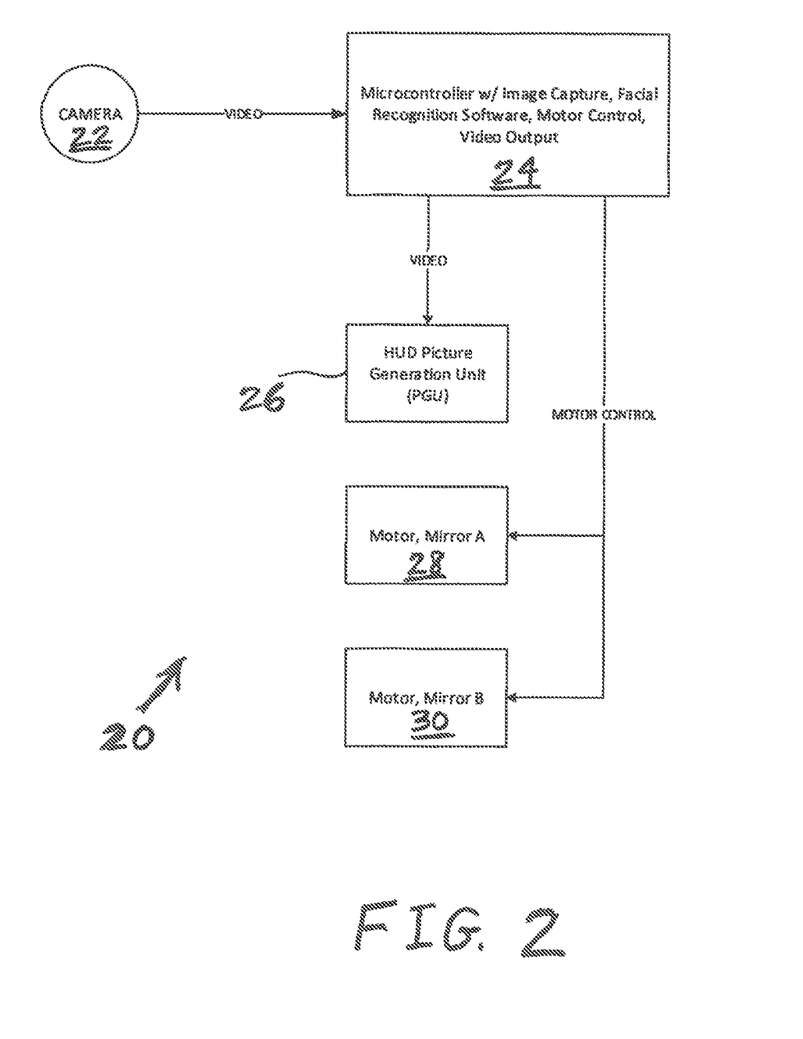
FIG. 2 is a block diagram of one example embodiment of an automotive head up display arrangement of the present invention.

Although FIG. 1 shows the driver's eyes to be within the HUD eyebox, it would still be feasible and/or desirable to adjust the virtual image to place his eyes in the center of the eyebox. FIG. 2 is a simplified system block diagram of an automotive head up display arrangement 20 which may adjust the virtual image to place the driver's eyes in the center of the eyebox. Arrangement 20 includes a camera 22, a microcontroller 24, a picture generation unit (PGU) 26, a first mirror motor 28, and a second mirror motor 30. Camera 22 captures images of the position of the driver's head from the viewpoint of FIG. 1, and may be mounted on the vehicle dashboard. Microcontroller 24 receives image data captured by camera 22 and determines the position of the driver's face based on the image data by use of facial recognition software. Microcontroller 24 then controls PGU 26 and motors 28, 30 in order to re-center the eyebox on the driver's eyes. Each of motors 28, 30 may adjust the position or orientation of a respective mirror that reflects a light field or image generated by PGU 26.

Figure 3:
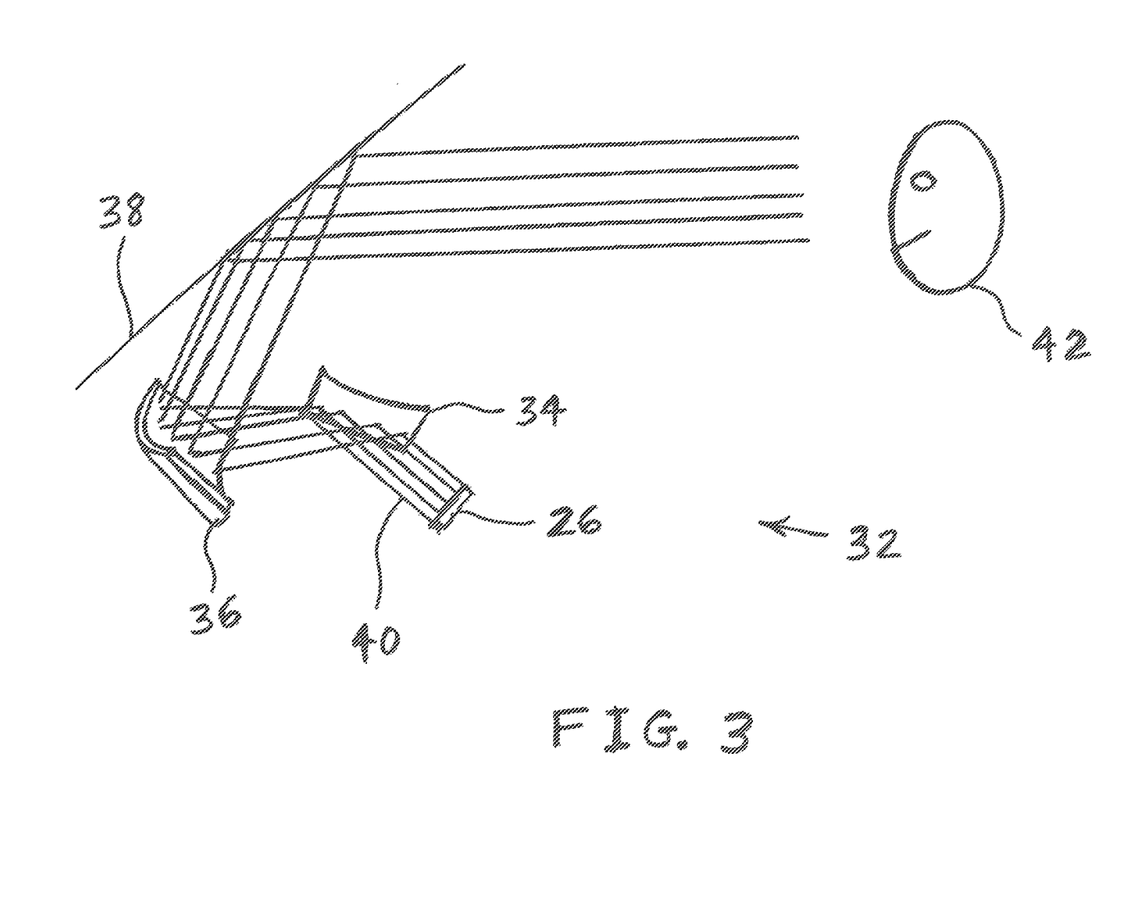
FIG. 3 is a schematic diagram of one example embodiment of an image generation apparatus suitable for use in the arrangement of FIG. 2.

FIG. 3 illustrates an image generation apparatus 32 suitable for use in arrangement 20, including PGU 26, a first mirror 34, a second mirror 36, and a vehicle windshield 38. First mirror 34 is driven by first motor 28, and second mirror 36 is driven by second motor 30. An image 40 projected by PGU 26 is reflected sequentially by first mirror 34, second mirror 36, and windshield 38 such that the image is visible in the eyebox by driver 42.

Figure 4:
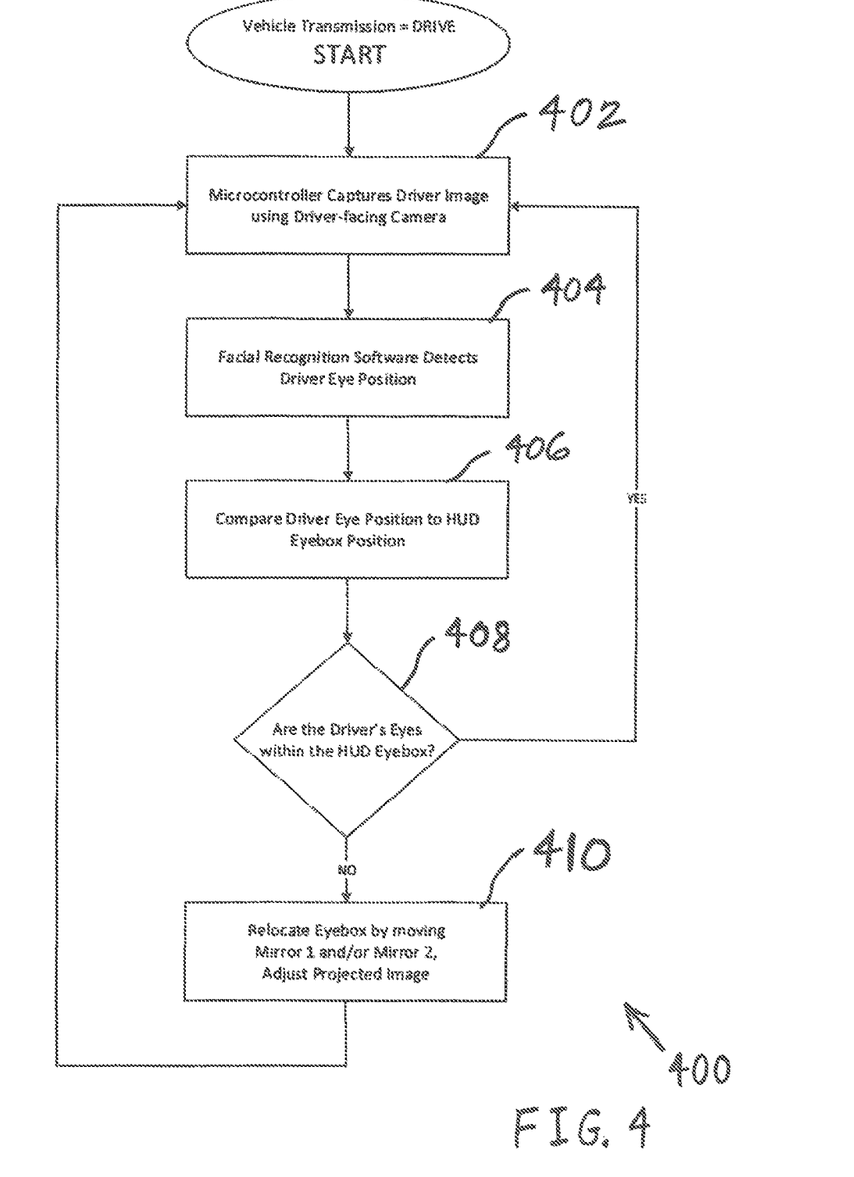
FIG. 4 is a flow chart of one example embodiment of a method of the present invention for operating an automotive head up display arrangement.

FIG. 4 illustrates one example embodiment of a method 400 of the present invention for operating an automotive head up display arrangement. In a first step 402, microcontroller 24 receives image data of a picture of the driver captured by driver-facing camera 22. In a second step 404, facial recognition software detects the positions of the driver's eyes 12a-b. Next, in step 406, the position of eyebox 14 is determined relative to the positions of the driver's eyes 12a-b. If the driver's eyes 12a-b are within eyebox 14, as determined in step 408, then operation returns to step 402. If, however, the driver's eyes 12a-b are not within eyebox 14, then in step 410 the position of eyebox 14 is adjusted by modifying any one or more of 1) the graphic content of PGU 26; 2) the location/orientation of first mirror 34; and 3) the location/orientation of second mirror 36. Operation then returns to step 402. In step 408, it may be determined whether the driver's eyes 12a-b are within the center of eyebox 14, rather than merely within eyebox 14.

Figure 5:
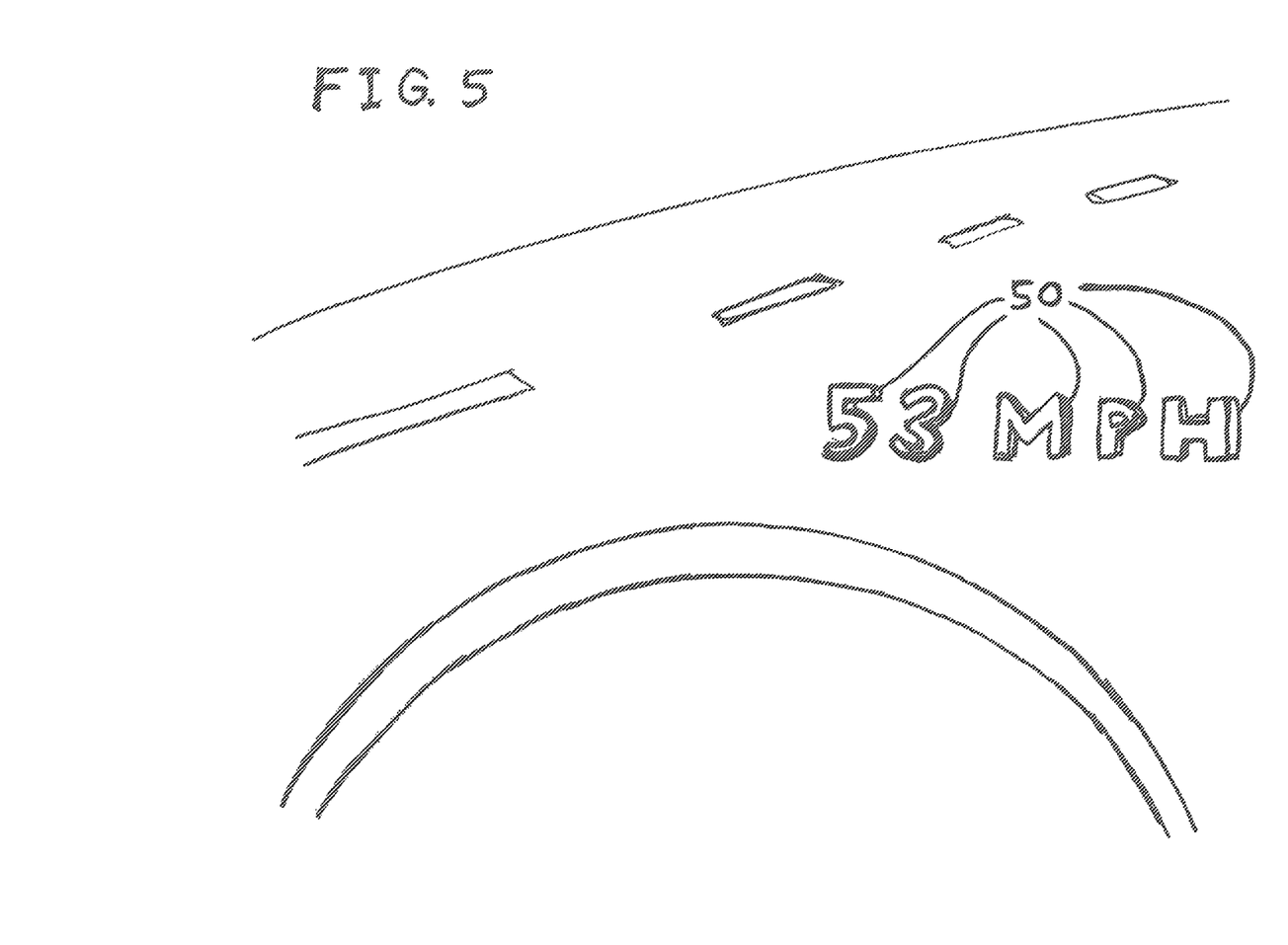
FIG. 5 is a plan view of an example HUD display of the invention with three-dimensionality.

Eyebox adjustment may include modification of the PGU image in order to provide the perception of depth (three-dimensionality) to the virtual image without changing the location of the eyebox. FIG. 5 illustrates a HUD image to which depth perception has been added. That is, the textual graphic is provided with a shadow 50 or depth detail when the driver's eye position is off center. In FIG. 5, the driver's eye position is right of center, and thus the shadow 50 is provided to the right of the text characters. The position of the driver's eyes 12a-b relative to the center of eyebox 14 may be determined in order to decide on which side of the text characters the shadows are to be placed. For example, if the driver's eyes 12a-b are to the right of the center of eyebox 14, looking in a forward direction, then the shadows may be to the right of the text characters.

In method 400, no effort is made to propose (or limit) the timing within the control loop. It is assumed that the eyebox assessment/adjustment will be made in a practical fashion, adjusting to the driver's seat position, posture, and stature while ignoring brief or temporary motion.

Figure 6:
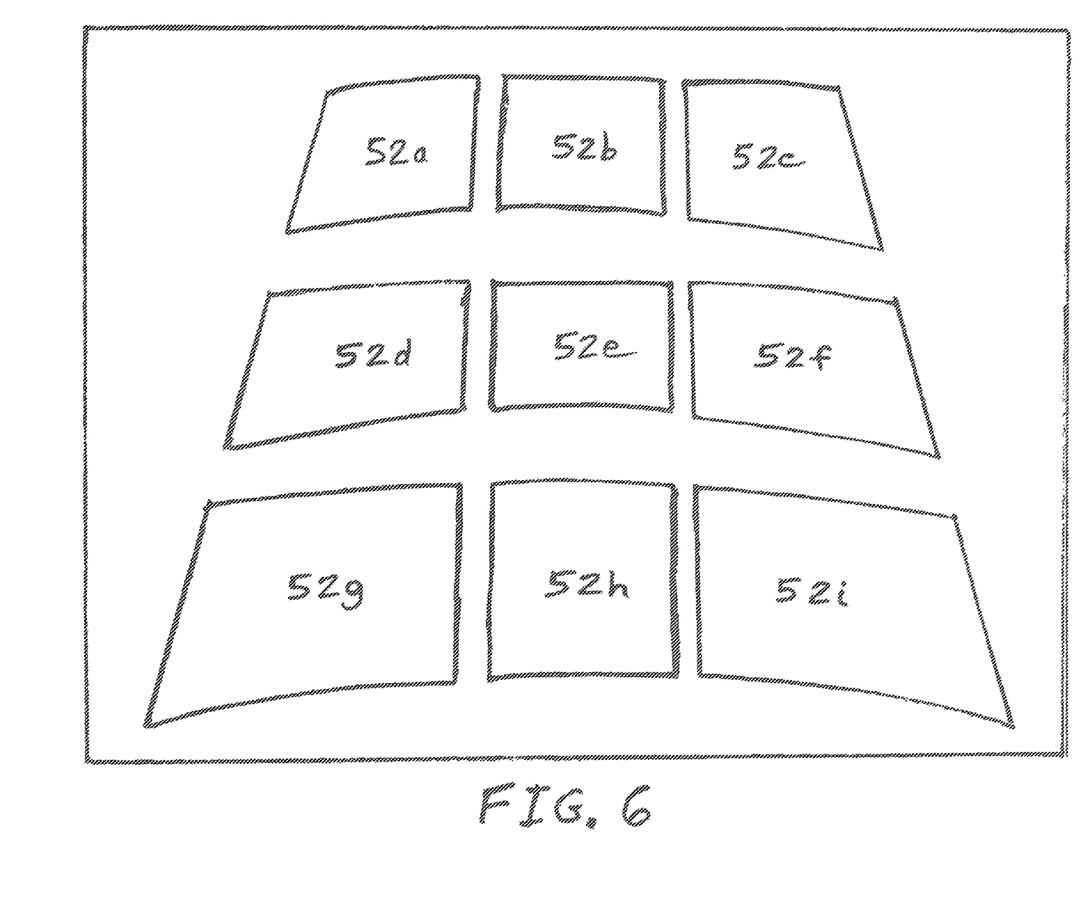
FIG. 6 is a plan view of an example of equalizing projection at the HUD LCD panel.

The image presented by the PGU or liquid crystal display (LCD) can be electronically pre-equalized to provide an image to the new eye box location that is undistorted by the re-positioned mirror(s) or lens(es). FIG. 6 is a representative view of projection at the HUD LCD panel wherein a rectangular image is projected as a non-rectangular matrix of individual image areas 52a-i.

The driver's position may be determined by multiple methods. One method is via image detection, including facial recognition with optional eye tracking. Other optical methods of determining the driver's position may include the use of infrared light emitting diodes. Other methods of determining the driver's position may include the use of an electric field, such as inductive/capacitive detection.

Figure 7:
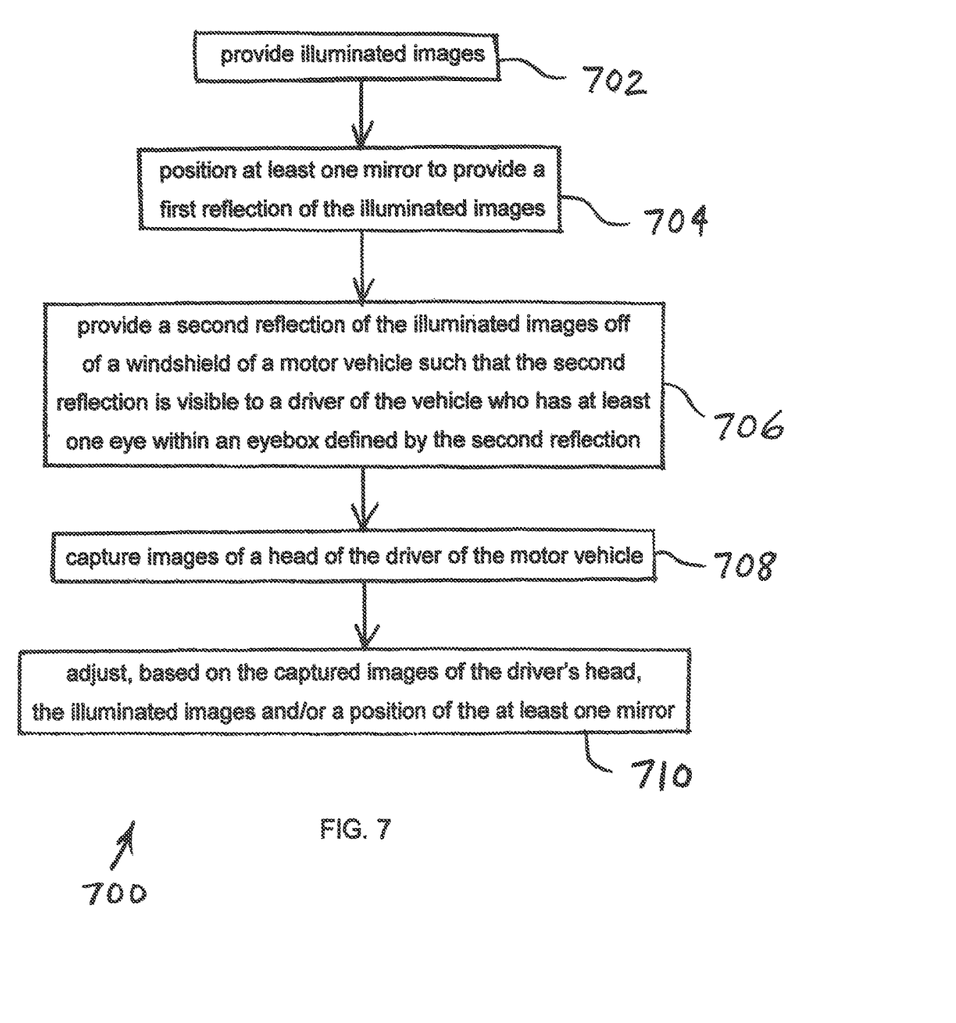
FIG. 7 is a flow chart of one embodiment of a head up display method of the invention for a motor vehicle.

FIG. 7 illustrates one embodiment of a head up display method 700 of the present invention for a motor vehicle. In a first step 702, illuminated images are provided. For example, as shown in FIG. 3, an image 40 may be projected by PGU 26.

Next, in step 704, at least one mirror is positioned to provide a first reflection of the illuminated images. For example, image 40 may be reflected by first mirror 34.

In a next step 706, a second reflection of the illuminated images off of a windshield of the motor vehicle is provided such that the second reflection is visible to a driver of the vehicle who has at least one eye within an eyebox defined by the second reflection. For example, after being reflected by first mirror 34, image 40 may be reflected by second mirror 36, and windshield 38 such that the image is visible in the eyebox by driver 42.

In step 708, images of a head of a driver of the motor vehicle are captured. For example, a camera 22 may be positioned to capture images of a head and face of the driver.

In a final step 710, the illuminated images and/or a position of the at least one mirror are adjusted based on the captured images of the driver's head. For example, images 40 may be adjusted to move the most important information within images 40 to a portion of eyebox that the driver can see based upon his current head position. As another example, the positions or orientations of one or both of mirrors 34, 36 may be adjusted so that the eyebox is moved to a position where the eyebox is fully visible given the determined position of the driver's head.

The foregoing description may refer to "motor vehicle", "automobile", "automotive", or similar expressions. It is to be understood that these terms are not intended to limit the invention to any particular type of transportation vehicle. Rather, the invention may be applied to any type of transportation vehicle whether traveling by air, water, or ground, such as airplanes, boats, etc.

The foregoing detailed description is given primarily for clearness of understanding and no unnecessary limitations are to be understood therefrom for modifications can be made by those skilled in the art upon reading this disclosure and may be made without departing from the spirit of the invention.

What is claimed is:

1. A head up display arrangement for a motor vehicle, the arrangement comprising:
    an image source configured to provide illuminated images based upon graphic content;
    at least one mirror positioned to provide a first reflection of the illuminated images;
    a windshield positioned to receive the first reflection and provide a second reflection of the illuminated images such that the second reflection is visible to a driver of the vehicle who has at least one eye within an eyebox defined by the second reflection;
    an image capturing device configured to capture images of a head of a driver of the motor vehicle; and
    an electronic processor configured to modify the graphic content of the image source based on the captured images of the driver's head and electronically pre-equalize the illuminated images based on the captured images of the driver's head.

2. The head up display arrangement of claim 1 wherein the adjusting comprises adding a shadow or other depth-related effect to a text character in the illuminated images.

3. The head up display arrangement of dam 1 wherein the electronic processor is configured to adjust, based on the captured images of the driver's head, a position of the at least one mirror.

4. The head up display arrangement of claim 1 wherein the electronic processor is configured to determine positions of the driver's eyes based on the captured images of the driver's head, and adjust, based on the positions of the driver's eyes, at least one of:
    the illuminated images; and
    a position of the at least one mirror.

5. The head up display arrangement of claim 1 wherein the at least one mirror comprises:
    a first mirror receiving the illuminated images and providing a first reflection thereof; and
    a second mirror receiving the first reflection of the illuminated images and providing a second reflection of the illuminated images, the electronic processor being configured to adjust, based on the captured images of the driver's head:
        a first position of the first mirror; and
        a second position of the second mirror.

6. A head up display method for a motor vehicle, the method comprising:
    providing illuminated images;
    positioning at least one mirror to provide a first reflection of the illuminated images;
    providing a second reflection of the illuminated images off of a windshield of the motor vehicle such that the second reflection is visible to a driver of the vehicle who has at least one eye within an eyebox defined by the second reflection;
    capturing images of a head of a driver of the motor vehicle; and
    electronically pre-equalizing the illuminated images based on the captured images of the driver's head.

7. The head up display method of claim 6 wherein the position of the at least one mirror is adjusted.

8. A head up display arrangement for a motor vehicle, the arrangement comprising:
    an image source configured to provide illuminated images;
    a first mirror positioned to provide a first reflection of the illuminated images;
    a first motor drivingly coupled to the first mirror;
    a second mirror positioned to receive the first reflection of the illuminated images and provide a second reflection of the illuminated images;
    a second motor drivingly coupled to the second mirror;
    a windshield positioned to receive the second reflection and provide a third reflection of the illuminated images such that the third reflection is visible to a driver of the vehicle who has at least one eye within an eyebox defined by the third reflection;
    an image capturing device configured capture images of a head of a driver of the motor vehicle; and
    an electronic processor communicatively coupled to each of the image source, the first motor, the second motor, and the image capturing device, the electronic processor being configured to:
        calculate a position of the eyebox based on the illuminated images and the positions of the first mirror and the second mirror;
        calculate, based on the captured images of the driver's head, positions of the driver's eyes; and
        electronically pre-equalize the illuminated images based on the calculated position of the eyebox and the calculated positions of the driver's eyes.

9. The head up display arrangement of claim 8 wherein the electronic processor is configured to adjust, based on the captured images of the driver's head:
    a position of the first mirror; and
    a position of the second mirror.

10. The head up display arrangement of claim 8 wherein the electronic processor is configured to determine positions of the driver's eyes based on the captured images of the driver's head, and adjust, based on the positions of the driver's eyes, at least one of:
    the illuminated images;
    a position of the first mirror; and
    a position of the second mirror.

11. The head up display method of claim 6 further comprising modifying graphic content of a picture generation unit based on the captured images of the driver's head.

12. The head up display arrangement of claim 8 wherein the electronic processor is configured to modify graphic content of a picture generation unit based on the captured images of the driver's head.

* * * * *